United States Patent
Chang et al.

(10) Patent No.: US 9,778,408 B2
(45) Date of Patent: Oct. 3, 2017

(54) BACKLIGHT MODULE AND DISPLAY DEVICE

(71) Applicant: InnoLux Corporation, Jhu-Nan, Miao-Li County (TW)

(72) Inventors: Chi-Liang Chang, Jhu-Nan (TW); Chia-Wei Hu, Jhu-Nan (TW); Yen-Liang Chen, Jhu-Nan (TW); Chia-Feng Chen, Jhu-Nan (TW)

(73) Assignee: Innolux Corporation, Jhu-Nan, Miao-li County (TW)

( * ) Notice: Subject to any disclaimer, the term of this patent is extended or adjusted under 35 U.S.C. 154(b) by 472 days.

(21) Appl. No.: 14/277,509

(22) Filed: May 14, 2014

(65) Prior Publication Data
US 2014/0340936 A1 Nov. 20, 2014

(30) Foreign Application Priority Data

May 14, 2013 (TW) .............................. 102117103 A
May 7, 2014 (TW) .............................. 103116296 A

(51) Int. Cl.
*F21V 8/00* (2006.01)
(52) U.S. Cl.
CPC .......... *G02B 6/0036* (2013.01); *G02B 6/0061* (2013.01)
(58) Field of Classification Search
CPC ............................. G02B 6/0035; G02B 6/0045
USPC .................................................. 362/613, 620
See application file for complete search history.

(56) References Cited

U.S. PATENT DOCUMENTS

| 7,364,341 B2 * | 4/2008 | Parker | F21V 5/00 359/599 |
| 7,452,120 B2 * | 11/2008 | Lee | G02B 5/045 362/223 |
| 9,028,125 B2 * | 5/2015 | Kikuchi | G02B 6/0038 362/609 |
| 2010/0214788 A1 * | 8/2010 | Kadono | C03C 17/006 362/311.01 |

(Continued)

FOREIGN PATENT DOCUMENTS

WO WO 2013/047774 A1 * 4/2013

*Primary Examiner* — Anabel Ton
(74) *Attorney, Agent, or Firm* — Muncy, Geissler, Olds & Lowe, P.C.

(57) ABSTRACT

A backlight module includes a plurality of first light emitting elements and a light guiding plate including a first side, a second side and a light output side having microstructures at least disposed in a near-light region of the light guiding plate. The near-light region is defined as from a first line to a predetermined second line at the light output side. The microstructure has a width P and height H, the light-guiding plate has a thickness T, a pitch between the adjacent first light-emitting elements is defined as $P_{LED}$, a projection distance from a luminance measuring line of the backlight module to the first light-emitting elements is defined as A. Under the conditions $0<A\le120$ mm, $0<[(H/P)/T]*P_{LED}\le15$ and $0<$luminance variation$\le100\%$, the structure characteristic of the backlight module is bounded by a first equation: $A=0.2\{[(H/P)/T]*P_{LED}\}^2-2\{[(H/P)/T]*P_{LED}\}+105$ mm and a second equation: $A=0.2\{[(H/P)/T]*P_{LED}\}^2-2\{[(H/P)/T]*P_{LED}\}+0.1$ mm.

19 Claims, 14 Drawing Sheets

(56) References Cited

U.S. PATENT DOCUMENTS

| | | | |
|---|---|---|---|
| 2012/0275139 A1* | 11/2012 | Chen | G02B 6/0025 362/97.2 |
| 2014/0211506 A1* | 7/2014 | Nakagome | G02B 6/0036 362/613 |
| 2014/0286044 A1* | 9/2014 | Johnson | G02B 5/021 362/607 |

* cited by examiner

BACKLIGHT MODULE AND DISPLAY DEVICE

CROSS REFERENCE TO RELATED APPLICATIONS

This Non-provisional application claims priority under 35 U.S.C. §119(a) on Patent Application No(s). 102117103 and 103116296 filed in Taiwan, Republic of China on May 14, 2013 and May 7, 2014, the entire contents of which are hereby incorporated by reference.

BACKGROUND OF THE INVENTION

Field of Invention

The invention relates to a backlight module and, in particular, to a backlight module and a display apparatus.

Related Art

Liquid crystal display (LCD) apparatuses, having advantages such as low power consumption, less heat, light weight and non-radiation, are widely applied to various electronic products and gradually take the place of cathode ray tube (CRT) display apparatuses.

Generally, an LCD apparatus mainly includes an LCD panel and a backlight module, and the backlight module provides light to the LCD panel for the purpose of display. Therefore, the light output quality of the backlight module will influence the quality of the display. For a conventional backlight module, hot spots usually occur at the edge portion (i.e. the near-light region) due to the uneven luminance. If the hot spot problem is severe, the user will perceive a bad display quality and the product will thus become less competitive.

Therefore, it is an important subject to provide a backlight module and a display apparatus that can provide the light output with a more even luminance so that the hot spot problem can be reduced and the display quality and product competitiveness can be increased.

SUMMARY OF THE INVENTION

In view of the foregoing subject, an objective of the invention is to provide a backlight module and a display apparatus that can provide the light output with a more even luminance so that the hot spot problem can be reduced.

To achieve the above objective, a backlight module according to the invention includes a light guiding plate and a plurality of first light emitting elements. The light guiding plate includes a first side and a second side opposite to each other, and a light output side connecting the first and second sides. A plurality of microstructures are at least disposed in a near-light region of the light output side. The near-light region is defined as from a first line between the first side and the light output side to a predetermined second line at the light output side and parallel to the first line, wherein the distance between the first line and the predetermined second line is equal to the two percents of the interval between the first and second sides. The first light emitting elements are disposed apart from each other and adjacent to the first side. A width and height of the microstructure are respectively defined as P (μm) and H (μm), a thickness of the light-guiding plate is defined as T (mm), a pitch between the adjacent first light-emitting elements is defined as $P_{LED}$ (mm), a projection distance from a luminance measuring line of the backlight module to the first light-emitting elements is defined as A (mm). Under the conditions $0 < A \leq 120$ mm, $0 < [(H/P)/T]*P_{LED} \leq 15$ and $0 <$ luminance variation $\leq 100\%$, the structure characteristic of the backlight module is bounded by a first equation: $A=0.2\{[(H/P)/T]*P_{LED}\}^2-2\{[(H/P)/T]*P_{LED}\}+105$ mm and a second equation: $A=0.2\{[(H/P)/T]*P_{LED}\}^2-2\{[(H/P)/T]*P_{LED}\}+0.1$ mm.

In one embodiment, the microstructure has a sectional shape selected from a group consisting of triangle, trapezoid, pentagon, heptagon, or polygon.

In one embodiment, the microstructure has a sectional shape having the form of an arch.

In one embodiment, the microstructure is connected to the light output side through a connection surface, the connection surface has a first width, the microstructure has a second width at the 95% of the height, and the second width is less than the first width.

In one embodiment, the microstructures are disposed in another region of the light output side in addition to the near-light region, and at least two of the microstructures have different heights. For example, the height of the microstructure in the near-light region is larger than that of the microstructure in the region other than the near-light region, or the height of the microstructure in the near-light region is less than that of the microstructure in the region other than the near-light region.

In one embodiment, the structure characteristic of the backlight module is further bounded by the first equation: $A=0.2\{[(H/P)/T]*P_{LED}\}^2-2\{[(H/P)/T]*P_{LED}\}+105$ mm and a third equation: $A=0.2\{[(H/P)/T]*P_{LED}\}^2-2\{[(H/P)/T]*P_{LED}\}+1.8$ mm.

In one embodiment, the structure characteristic of the backlight module is further bounded by the first equation: $A=0.2\{[(H/P)/T]*P_{LED}\}^2-2\{[(H/P)/T]*P_{LED}\}+105$ mm and a fourth equation: $A=0.2\{[(H/P)/T]*P_{LED}\}^2-2\{[(H/P)/T]*P_{LED}\}+3$ mm.

In one embodiment, the structure characteristic of the backlight module is further bounded by the first equation: $A=0.2\{[(H/P)/T]*P_{LED}\}^2-2\{[(H/P)/T]*P_{LED}\}+105$ mm and a fifth equation: $A=0.2\{[(H/P)/T]*P_{LED}\}^2-2\{[(H/P)/T]*P_{LED}\}+5$ mm.

In one embodiment, the structure characteristic of the backlight module is further bounded by the first equation: $A=0.2\{[(H/P)/T]*P_{LED}\}^2-2\{[(H/P)/T]*P_{LED}\}+105$ mm and a sixth equation: $A=0.2\{[(H/P)/T]*P_{LED}\}^2-2\{[(H/P)/T]*P_{LED}\}+45$ mm.

In one embodiment, the structure characteristic of the backlight module is further bounded by the first equation: $A=0.2\{[(H/P)/T]*P_{LED}\}^2-2\{[(H/P)/T]*P_{LED}\}+105$ mm and a seventh equation: $A=0.2\{[(H/P)/T]*P_{LED}\}^2-2\{[(H/P)/T]*P_{LED}\}+49$ mm.

In one embodiment, the structure characteristic of the backlight module is further bounded by the first equation: $A=0.2\{[(H/P)/T]*P_{LED}\}^2-2\{[(H/P)/T]*P_{LED}\}+105$ mm and a eighth equation: $A=0.2\{[(H/P)/T]*P_{LED}\}^2-2\{[(H/P)/T]*P_{LED}\}+52$ mm.

In one embodiment, the height H is less than or equal to 500 μm and greater than zero.

In one embodiment, the width P is less than or equal to 3000 μm and greater than zero.

In one embodiment, the thickness T is less than 3 mm and greater than zero.

In one embodiment, the pitch $P_{LED}$ is less than 20 mm and greater than zero.

In one embodiment, the backlight module further comprises a plurality of second light emitting elements disposed apart from each other and adjacent to the second side.

To achieve the above objective, a display apparatus according to the invention comprises a backlight module and a display panel. The backlight module can be anyone of the above backlight modules. The display panel is disposed adjacent to the backlight module providing the light to the display panel.

As mentioned above, in the display apparatus and backlight module according to the invention, the light output side of the light guiding plate includes a plurality of microstructures, and the distribution of the hot spots of the backlight module is related to the width and height of the microstructure, the thickness of the light guiding plate, the pitch of the light emitting elements, and the projection distance from a luminance measuring line of the backlight module to the light emitting element. Therefore, by designing the structure characteristic of the backlight module as bounded by the first equation: $A=0.2\{[(H/P)/T]*P_{LED}\}^2-2\{[(H/P)/T]*P_{LED}\}+105$ mm and the second equation: $A=0.2\{[(H/P)/T]*P_{LED}\}^2-2\{[(H/P)/T]*P_{LED}\}+0.1$ mm, the display apparatus and backlight module can obtain the light output effect with a higher luminance uniformity and the hot spot problem can be effectively reduced.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Before illustrating the backlight module of the invention, some parameters that can influence the light output of the backlight module need to be described so that the technical features of the embodiments of the invention can be more easily understood.

Figure 1A:
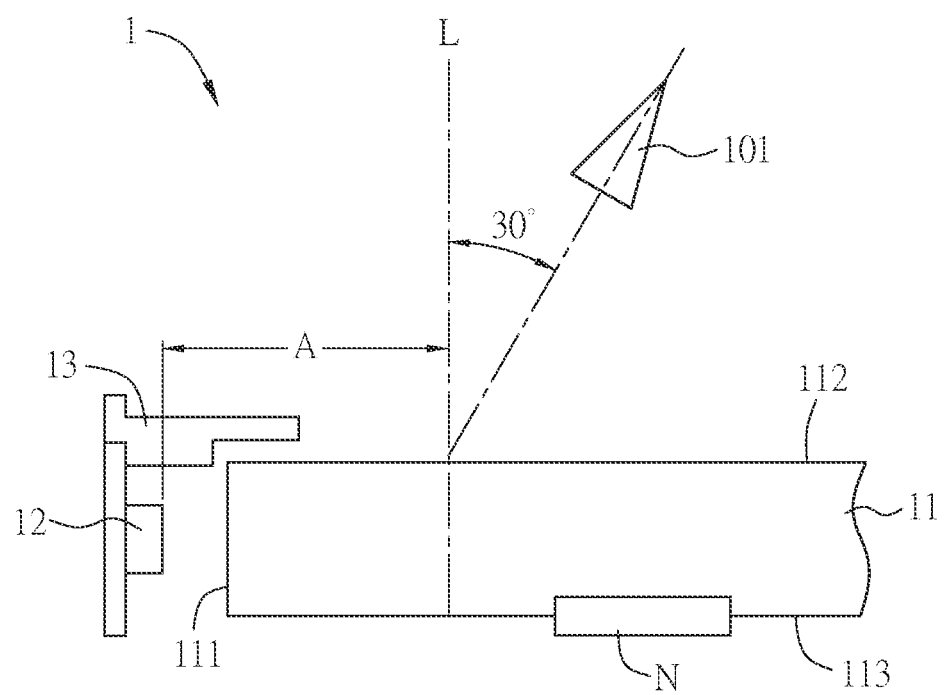
FIGS. 1A and 1B are schematic diagrams showing the situation of testing the uniformity of the luminance of a backlight module.
Figure 1B:
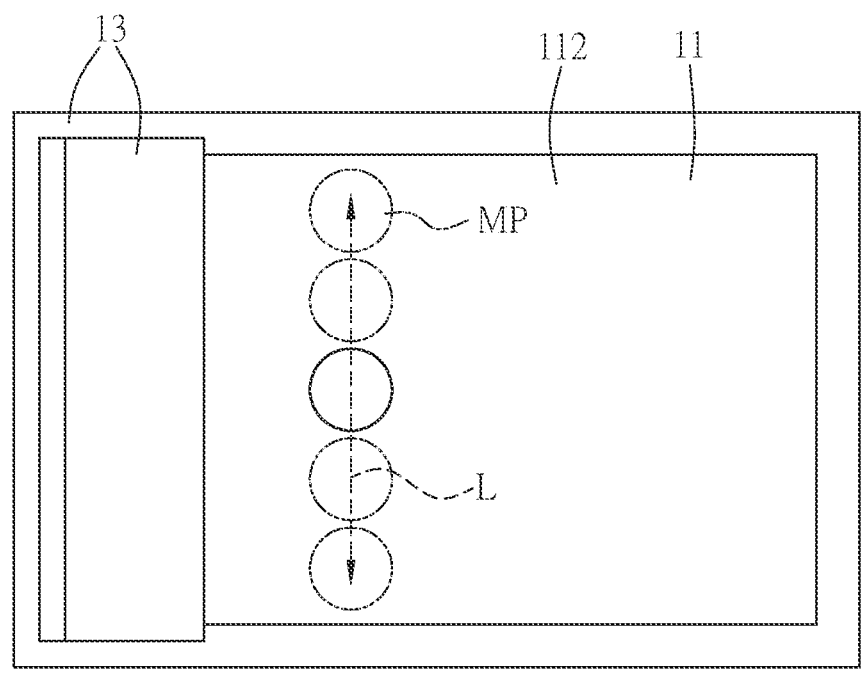

FIGS. 1A and 1B are schematic diagrams showing the situation of testing the uniformity of the luminance of a backlight module. A backlight module 1 includes a light guiding plate 11, a plurality of light emitting elements 12 and a plastic frame 13. The light guiding plate 11 includes an incident surface 111, a light output surface 112 and a bottom surface 113. The light emitting elements 12 are disposed adjacent to the incident surface 111 and apart from each other. The light emitting element 12 is an LED device for example. The light emitted by the light emitting elements 12 is applied to the light guiding plate 11 through the incident surface 111 and leaves the light guiding plate 11 through the light output surface 112 due to the effects of reflection, refraction, etc. The bottom surface 113 includes a plurality of net points N, which can change the traveling direction of the light in the light guiding plate 11 so that the light can leave the light guiding plate 11 through the light output surface 112 without undergoing the total internal reflection (TIR). For a clear illustration, just a net point N is shown in FIG. 1A. The plastic frame 13 is disposed over the light emitting elements 12 and a part of the light guiding plate 11. A detector 101 is used for a luminance measuring operation along a luminance measuring line L. In the luminance measuring operation, the detector 101 is inclined for 30° with respect to the normal vector of the light output surface 112 to measure the luminances of a plurality of points along the line-up direction of the light emitting elements 12. The measured points MPs shown in FIG. 1B for example (the size of the measured point MP doesn't represent the actual size) are disposed on the luminance measuring line L. Then, the maximum and minimum luminance values can be found, and a luminance variation is defined as "(the maximum luminance value–the minimum luminance value)/the minimum luminance value". The less luminance variation represents the better uniformity of luminance. The relation between the light output effect of the backlight module, a projection distance A from the luminance measuring line L to the light emitting element 12, and the uniformity of luminance is illustrated as below. When the projection distance A is fixed, the higher uniformity of luminance (i.e. less luminance variation) represents the better light output effect of the backlight module, especially for the near-light region (near the incident surface) of the backlight module, and the hot spot problem of the near-light region is reduced. When the uniformity of luminance is fixed, the less projection distance A represents the better light output effect of the backlight module. Herein, the projection distance A is defined as, for example, from the luminance measuring line to a front edge of the light emitting element 12, but this invention is not limited thereto.

Figure 2A:
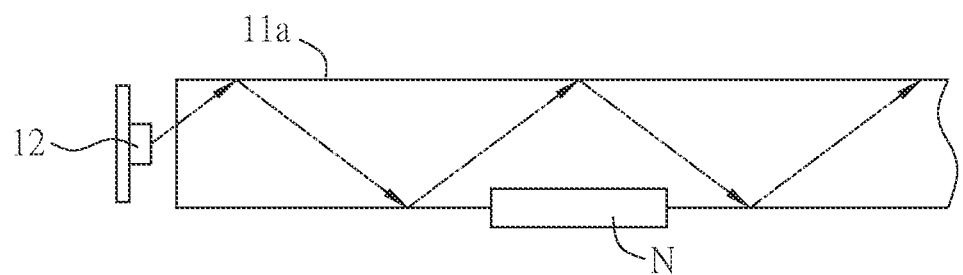
FIGS. 2A and 2B are schematic diagrams showing the influence of the light guiding plates with different widths on the incident light.
Figure 2B:
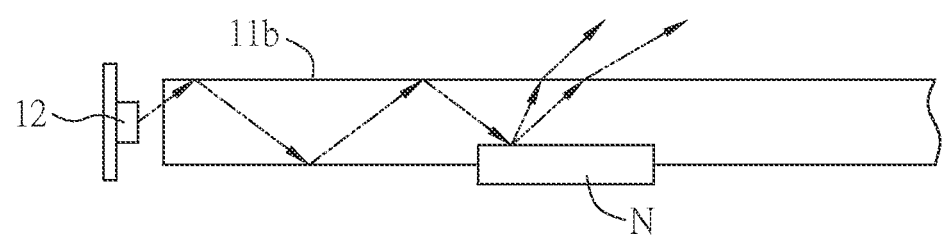

FIGS. 2A and 2B are schematic diagrams showing the influence of the light guiding plates with different widths on the incident light. The light guiding plate 11a in FIG. 2A is thicker than the light guiding plate 11b in FIG. 2B. The light traveling in the thinner light guiding plate will undergo more collisions and thus the probability of the light leaving the light guiding plate when hitting the net point N is increased, so that the light doesn't easily diffuse forward and sideward. Accordingly, the gathering level of the light in the light guiding plate 11b is higher than that of the light in the light guiding plate 11a, and that means the hot spot problem of the light guiding plate 11b is severer and the farther distance is required to achieve a high uniformity of luminance.

Figure 3A:
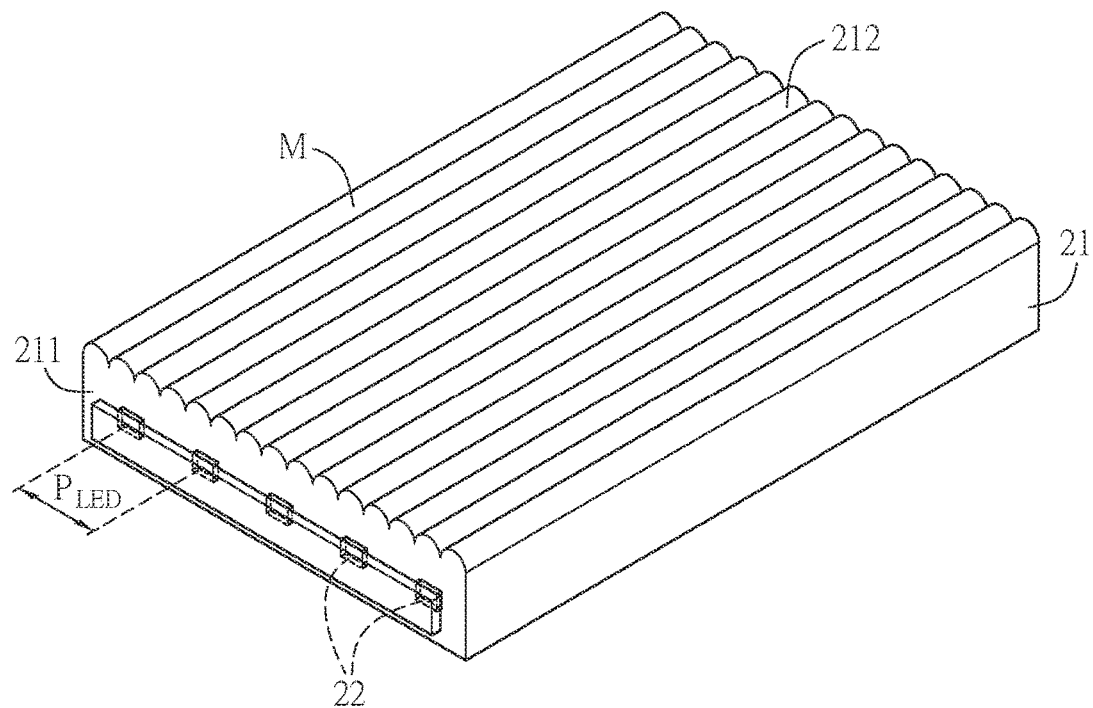
FIG. 3A is a schematic diagram showing the influence of the microstructure disposed on the light output side of the light guiding plate upon the light output effect.
Figure 3B:
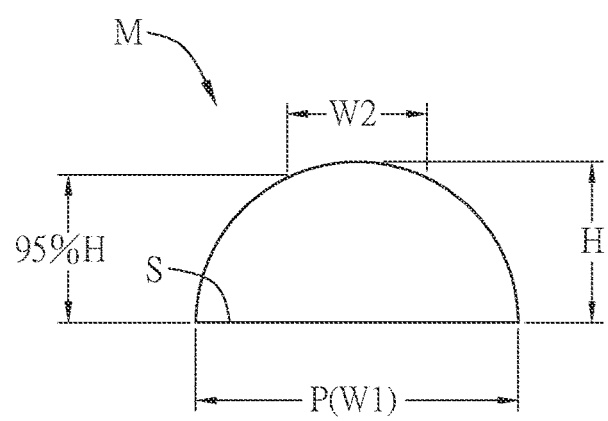
FIG. 3B is a schematic sectional diagram of a microstructure.
Figure 3C:
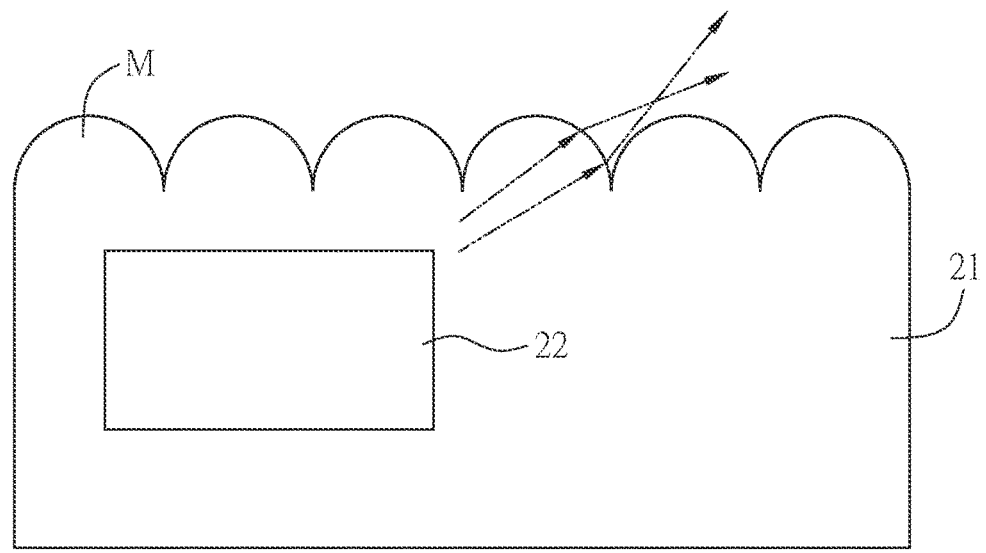
FIG. 3C is a schematic diagram showing the influence of the microstructure of the near-light region of the light guiding plate on the light.
Figure 3D:
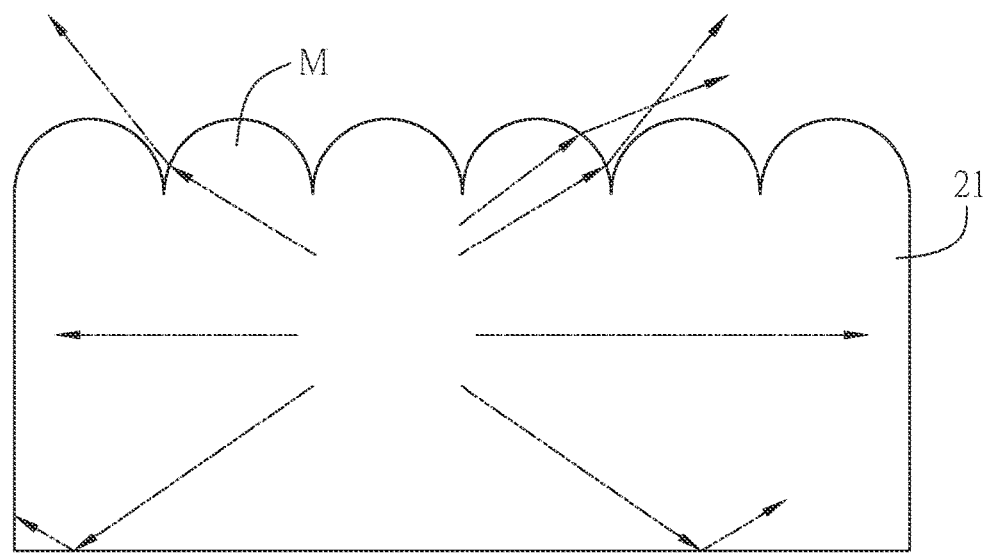
FIG. 3D is a schematic diagram showing the influence of the microstructure of the far-light region of the light guiding plate 21 on the light.

FIG. 3A is a schematic diagram showing the influence of the microstructure disposed on the light output side of the light guiding plate on the light output effect. As shown in FIG. 3A, a light guiding plate 21 includes an incident side 211 and a light output side 212. A plurality of light emitting elements 22 are disposed adjacent to the incident side 211, and the light output side 212 has a plurality of microstructures M. FIG. 3B is a schematic sectional diagram of one of the microstructures M in FIG. 3A. The sectional shape of the microstructure M has a width P and a height H, and has the form of an arch. According to a verification, when the microstructure M has a greater height H, less width P, or greater ratio (H/P) of the height H to the width P, the uniformity of luminance of the near-light region of the light guiding plate 21 can be increased. Besides, when the microstructure M has a less height H, greater width P, or less ratio (H/P) of the height H to the width P, the uniformity of luminance of the far-light region of the light guiding plate 21 will be increased. The related principle can be understood by referring to FIGS. 3C and 3D. In FIG. 3C showing the influence of the microstructure M of the near-light region of the light guiding plate 21 on the light, the microstructure M of the near-light region can cause the large-angle light to leave the light guiding plate more easily, and thus the light-emitting angle of the near-light region and the luminance of the dark zone of the near-light region can be both increased so that the hot spot problem of the near-light region can be reduced. Accordingly, the greater ratio of H/P of the microstructure is better for the near-light region. FIG. 3D shows the influence of the microstructure M of the far-light region of the light guiding plate 21 on the light. As shown in FIG. 3D, because the large-angle light mostly leaves the light guiding plate through the near-light region, the large-angle light is less in the far-light region. Besides, the remaining large-angle light in the far-light region will leave the light guiding plate when hitting the microstructures M, so that the sideward diffusing effect of the light becomes less. Accordingly, the gathering level of the light is higher and the hot spot problem is severer. Therefore, the less ratio of H/P of the microstructure is better for the far-light region. However, the above-mentioned design about the microstructure is for the normal case, and it can be varied when other kind of effect, such as 3D effect, is included.

Additionally, FIG. 3A also shows the influence of the pitch $P_{LED}$ of the light emitting elements 22 on the light output effect. When the pitch $P_{LED}$ is less, the light beams emitted by the light emitting elements 22 will have more overlap so that the uniformity of luminance of the near-light and far-light regions can be increased and the hot spot problem can be reduced. However, the less pitch $P_{LED}$ represents the more light emitting elements 22 and the cost is increased.

So far, the projection distance A from the luminance measuring line L to the light emitting element 22, the thickness T of the light guiding plate, the height of the microstructure, the ratio of H/P, and the pitch $P_{LED}$ of the light emitting elements 22 will all influence the light output effect of the light guiding plate.

Figure 4:
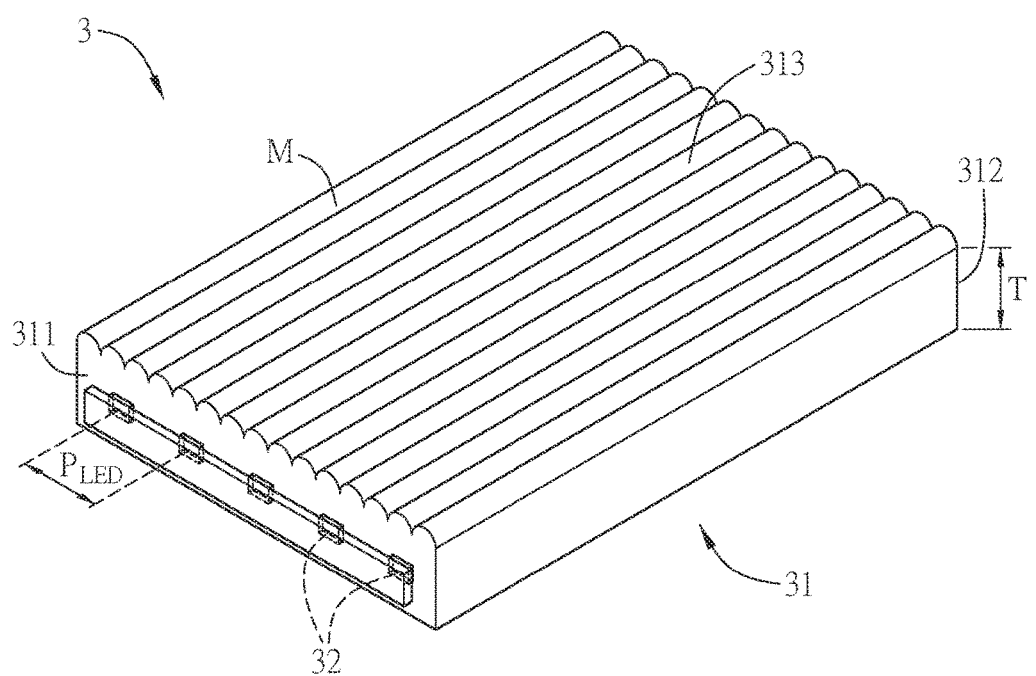
FIG. 4 is a schematic diagram of a backlight module according to a preferred embodiment of the invention.
Figure 5:
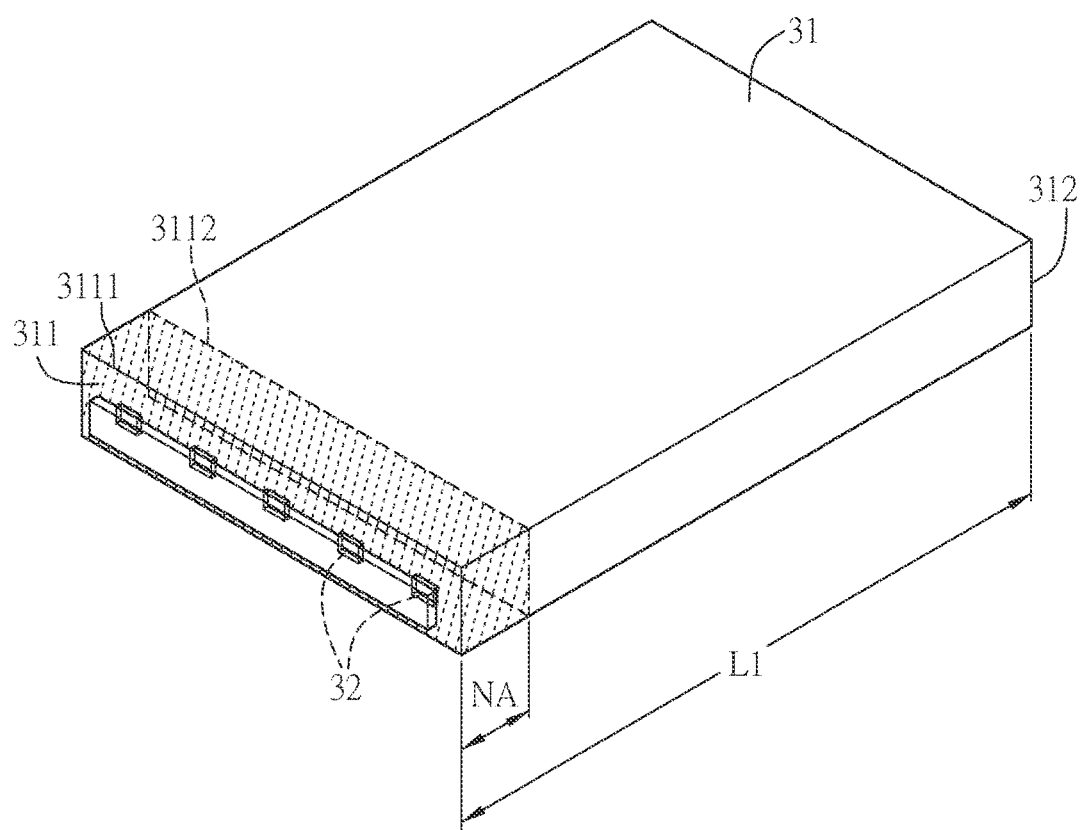
FIG. 5 is a schematic diagram showing the definition of a near-light region according to a preferred embodiment of the invention.

FIG. 4 is a schematic diagram of a backlight module 3 according to a preferred embodiment of the invention. As shown in FIG. 4, the backlight module 3 includes a light guiding plate 31 and a plurality of first light emitting elements 32. The light guiding plate 31 includes a first side 311 and a second side 312, and the first and second sides 311 and 312 are opposite to each other. The light guiding plate 31 further includes a light output side 313, which includes a plurality of microstructures M at least disposed in a near-light region of the light guiding plate 31. FIG. 5 shows the definition of the near-light region NA of this embodiment, which is a region of the light output side 31 from a first line 3111 between the first side 311 and the light output side 31 to a predetermined second line 3112 at the light output side and parallel to the first line 3111, wherein the distance between the first line 3111 and the predetermined second line 3112 is equal to two percents of the interval L1 between the first and second sides. In this embodiment, the microstructures are not only disposed in the near-light region NA but also disposed on the whole light output side 313.

The first light emitting elements 32 are disposed apart from each other and adjacent to the first side 311. Herein, the first light emitting elements 32 are LEDs for example, and the first light emitting elements 32 are disposed on a circuit board (not shown).

Figure 6:
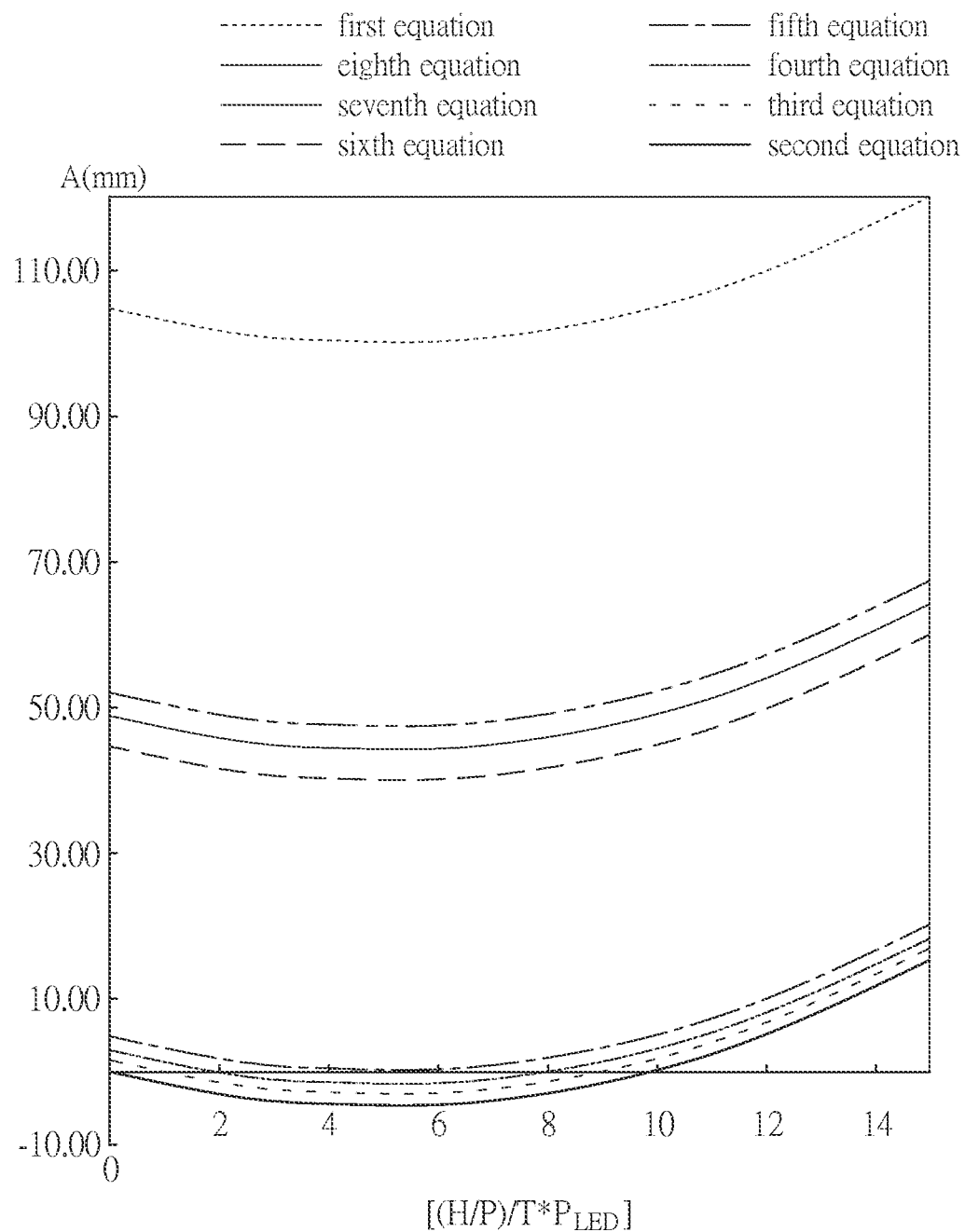
FIG. 6 is a schematic diagram showing the structure characteristic of a backlight module according to a preferred embodiment of the invention.

FIG. 3B shows a sectional form of the microstructure M. The microstructure M is connected to the light output side 313 through a connection surface S. The connection surface S has a first width W1, the microstructure has a second width W2 at the 95% of the height H, and the second width W2 is less than the first width W1. In this embodiment, the sectional shape of the microstructure M is an arch for example. As shown in FIGS. 3B and 4, a width and height of the microstructure M are respectively defined as P (e.g. the first width with the unit of "μm") and H (with the unit of "μm"), a thickness of the light-guiding plate 31 is defined as T (with the unit of "mm"), a pitch between the adjacent first light-emitting elements 32 is defined as $P_{LED}$ (with the unit of "mm"), a projection distance A from a luminance measuring line L of the backlight module 3 to the first light-emitting elements is defined as A (with the unit of "mm"). Under the conditions of $0<A \leq 120$ mm, $0<[(H/P)/T]*P_{LED} \leq 15$ and $0<$luminance variation$\leq 100\%$, the structure characteristic of the backlight module 3 is bounded by a first equation: $A=0.2\{[(H/P)/T]*P_{LED}\}^2-2\{[(H/P)/T]*P_{LED}\}+105$ mm and a second equation: $A=0.2\{[(H/P)/T]*P_{LED}\}^2-2\{[(H/P)/T]*P_{LED}\}+0.1$ mm, as shown in FIG. 6. By such design, the backlight module 3 can be provided with a better uniformity of luminance and reasonable cost.

As an embodiment, the height H of the microstructure M is less than or equal to 500 μm and greater than zero, and the width P thereof is less than or equal to 3000 μm and greater than zero. The thickness T of the light guiding plate 31 is less than 3 mm and greater than zero. The pitch $P_{LED}$ of the first light emitting elements 32 is less than 20 mm and greater than zero. However, the invention is not limited thereto.

When the thickness T of the light guiding plate 31 is changed, the structure characteristic of the backlight module 3 can be changed accordingly. For example, when the thickness T becomes less, the structure characteristic of the backlight module 3 is further bounded by the first equation: $A=0.2\{[(H/P)/T]*P_{LED}\}^2-2\{[(H/P)/T]*P_{LED}\}+105$ mm and a third equation: $A=0.2\{[(H/P)/T]*P_{LED}\}^2-2\{[(H/P)/T]*P_{LED}\}+1.8$ mm, or further bounded by the first equation: $A=0.2\{[(H/P)/T]*P_{LED}\}^2-2\{[(H/P)/T]*P_{LED}\}+105$ mm and a fourth equation: $A=0.2\{[(H/P)/T]*P_{LED}\}^2-2\{[(H/P)/T]*P_{LED}\}+3$ mm, or further bounded by the first equation:

$A=0.2\{[(H/P)/T]*P_{LED}\}^2-2\{[(H/P)/T]*P_{LED}\}+105$ mm and a fifth equation: $A=0.2\{[(H/P)/T]*P_{LED}\}^2-2\{[(H/P)/T]*P_{LED}\}+5$ mm, or further bounded by the first equation: $A=0.2\{[(H/P)/T]*P_{LED}\}^2-2\{[(H/P)/T]*P_{LED}\}+105$ mm and a sixth equation: $A=0.2\{[(H/P)/T]*P_{LED}\}^2-2\{[(H/P)/T]*P_{LED}\}+45$ mm, or further bounded by the first equation: $A=0.2\{[(H/P)/T]*P_{LED}\}^2-2\{[(H/P)/T]*P_{LED}\}+105$ mm and a seventh equation: $A=0.2\{[(H/P)/T]*P_{LED}\}^2-2\{[(H/P)/T]*P_{LED}\}+49$ mm, or further bounded by the first equation: $A=0.2\{[(H/P)/T]*P_{LED}\}^2-2\{[(H/P)/T]*P_{LED}\}+105$ mm and a eighth equation: $A=0.2\{[(H/P)/T]*P_{LED}\}^2-2\{[(H/P)/T]*P_{LED}\}+52$ mm, as shown in FIG. 6. By such design, the backlight module 3 can be provided with a better uniformity of luminance and reasonable cost.

The microstructure of the invention can have variations in disposition, and some examples are illustrated as below.

Figure 7:
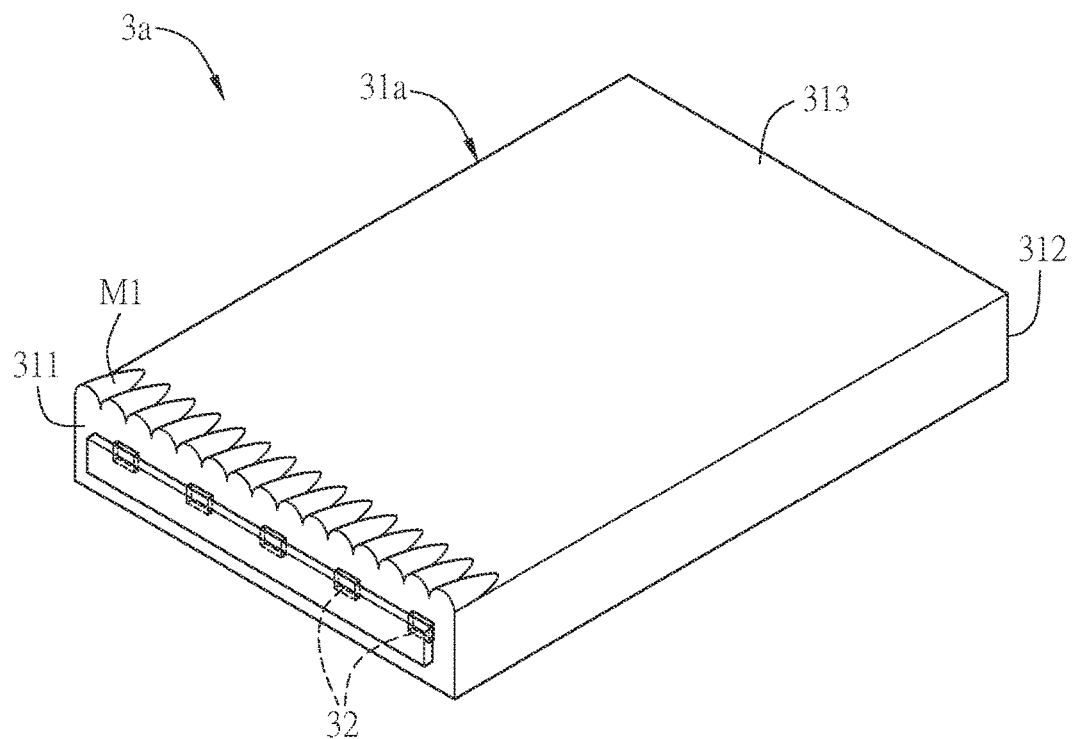
FIGS. 7 to 9 are schematic diagrams of other backlight modules according to a preferred embodiment of the invention.

As shown in FIG. 7, a light guiding plate 31a of a backlight module 3a includes a first side 311, a second side 312 opposite to the first side 311, and a light output side 313, and the light output side 313 includes a plurality of microstructures M1s at least disposed in a near-light region of the light guiding plate 31a. The near-light region is defined as a region on the light output side 313 from the first side 311 to a predetermined position, wherein the distance between the first side 311 and the predetermined position is equal to two percents of the interval between the first and second sides. In other words, in this embodiment, the region of the light output side 313 except the near-light region is without the microstructure. As mentioned above, the greater ratio of H/P of the microstructure is better for the near-light region, and the less ratio of H/P of the microstructure is better for the far-light region. In this embodiment, the ratio of H/P of the microstructure M1 is getting less along the direction from the first side 311 to the second side 312, and the far-light region is without the microstructure, so the whole light guiding plate 31a can be configured with a better uniformity of the light output. Besides, under the conditions of $0<A≤120$ mm, $0<[(H/P)/T]*P_{LED}≤15$ and $0<$luminance variation$≤100\%$, the structure characteristic of the backlight module 3a is bounded by a first equation: $A=0.2\{[(H/P)/T]*P_{LED}\}^2-2\{[(H/P)/T]*P_{LED}\}+105$ mm and a second equation: $A=0.2\{[(H/P)/T]*P_{LED}\}^2-2\{[(H/P)/T]*P_{LED}\}+0.1$ mm, as shown in FIG. 6.

Figure 8:
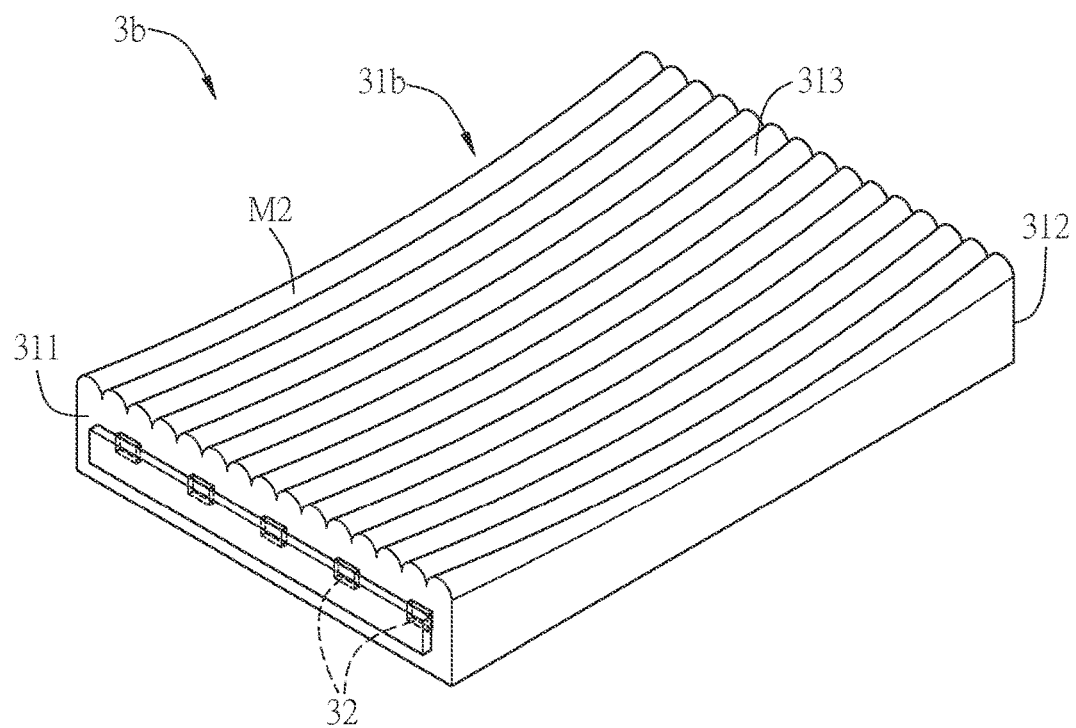

As shown in FIG. 8, a light guiding plate 31b of a backlight module 3b includes a first side 311, a second side 312 opposite to the first side 311, and a light output side 313, and the light output side 313 includes a plurality of microstructures M2, which are disposed from the first side 311 to the second side 312 and on the whole light output side 313. In other words, the microstructures M2 are disposed in another region of the light output side in addition to the near-light region. Moreover, in this embodiment, in addition to the first light emitting elements 32 disposed adjacent to the first side 311, the second light emitting elements (not shown) are disposed apart from each other and adjacent to the second side 312, which means the first side 311 and the second side 312 are both incident sides so the light guiding plate 31b has two near-light regions corresponding to the first side 311 and the second side 312, respectively. In this embodiment, at least two of the microstructures M2 have different heights. Herein, the height of the microstructure M2 in the near-light region is larger than that of the microstructure M2 in the region other than the near-light region (such as the central region of the light guiding plate 31b). As mentioned above, the greater ratio of H/P of the microstructure is better for the near-light region, and the less ratio of H/P of the microstructure is better for the far-light region. In this embodiment, the ratio of H/P of the microstructure M2 in the near-light region is greater than that in the far-light region, so the light guiding plate 31b can be configured with a better uniformity of the light output. Besides, under the conditions of $0<A≤120$ mm, $0<[(H/P)/T]*P_{LED}≤15$ and $0<$luminance variation$≤100\%$, the structure characteristic of the backlight module 3b is bounded by a first equation: $A=0.2\{[(H/P)/T]*P_{LED}\}^2-2\{[(H/P)/T]*P_{LED}\}+105$ mm and a second equation: $A=0.2\{[(H/P)/T]*P_{LED}\}^2-2\{[(H/P)/T]*P_{LED}\}+0.1$ mm, as shown in FIG. 6.

Figure 9:
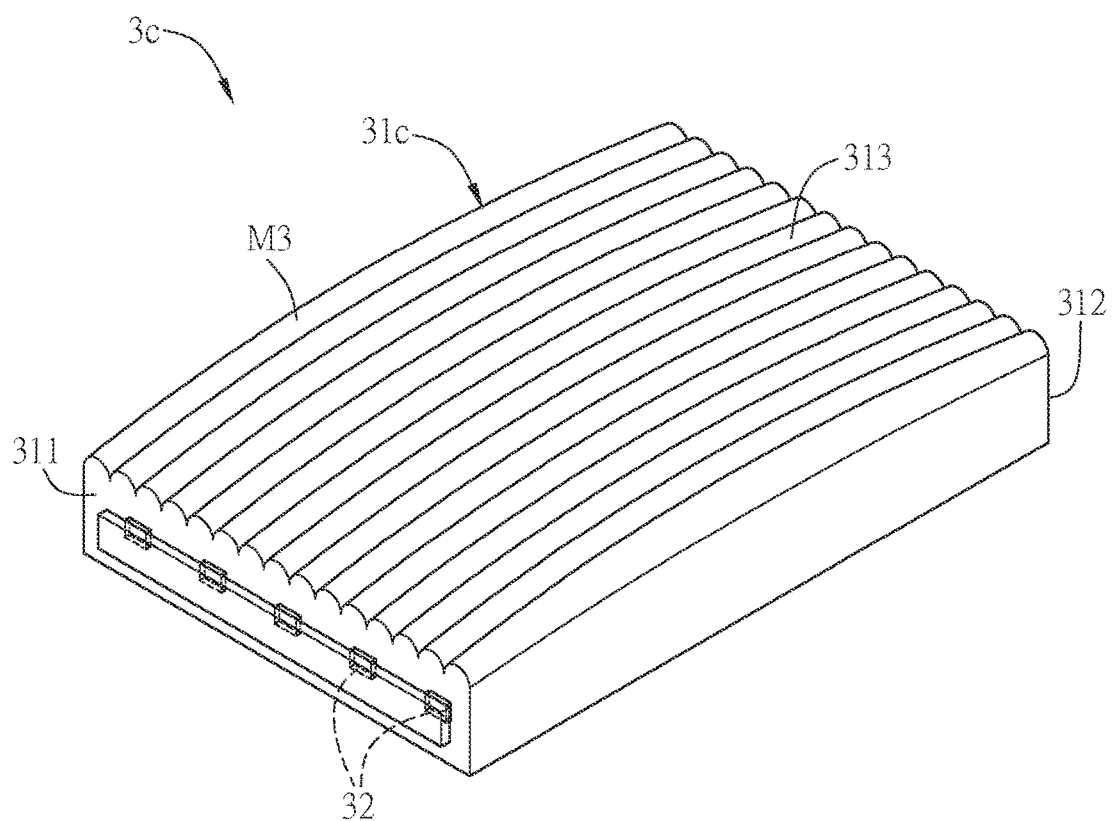

As shown in FIG. 9, a light guiding plate 31c of a backlight module 3c includes a first side 311, a second side 312 opposite to the first side 311, and a light output side 313, and the light output side 313 includes a plurality of microstructures M3, which are disposed from the first side 311 to the second side 312 and on the whole light output side 313. In other words, the microstructures M3 are disposed in another region of the light output side in addition to the near-light region. Moreover, in this embodiment, in addition to the first light emitting elements 32 disposed adjacent to the first side 311, the second light emitting elements (not shown) are disposed apart from each other and adjacent to the second side 312, which means the first side 311 and the second side 312 are both incident sides so the light guiding plate 31c has two near-light regions corresponding to the first side 311 and the second side 312, respectively. In this embodiment, at least two of the microstructures M3 have different heights. Herein, the height of the microstructure M3 in the near-light region is less than that of the microstructure M3 in the region other than the near-light region (such as the central region of the light guiding plate 31c). In this embodiment, because the luminance uniformity of the light output and the 3D display effect are both taken into account, the ratio of H/P of the microstructure M3 in the near-light region is designed to achieve a sufficient value to avoid the hot spots generated in the near-light region, and the ratio of H/P of the microstructure M3 in the far-light region (such as the central portion of the light guiding plate 31c) is designed to achieve a higher value, under the condition of sufficient luminance uniformity, to enhance the gathering level of the light for a better 3D display effect. Besides, under the conditions of $0<A≤120$ mm, $0<[(H/P)/T]*P_{LED}≤15$ and $0<$luminance variation$≤100\%$, the structure characteristic of the backlight module 3c is bounded by a first equation: $A=0.2\{[(H/P)/T]*P_{LED}\}^2-2\{[(H/P)/T]*P_{LED}\}+105$ mm and a second equation: $A=0.2\{[(H/P)/T]*P_{LED}\}^2-2\{[(H/P)/T]*P_{LED}\}+0.1$ mm, as shown in FIG. 6.

The above-mentioned microstructures M~M3 all have forms of an arch in cross-section for example, but the invention is not limited thereto. The microstructure can have other sectional shapes, such as triangle, trapezoid, pentagon, heptagon, or polygon, and some examples are illustrated as below.

Figure 10A:
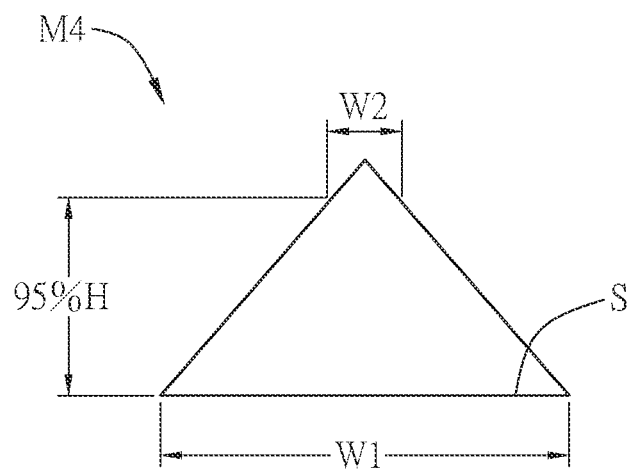
FIGS. 10A to 10C are schematic sectional diagrams of other microstructures according to a preferred embodiment of the invention.
Figure 10B:
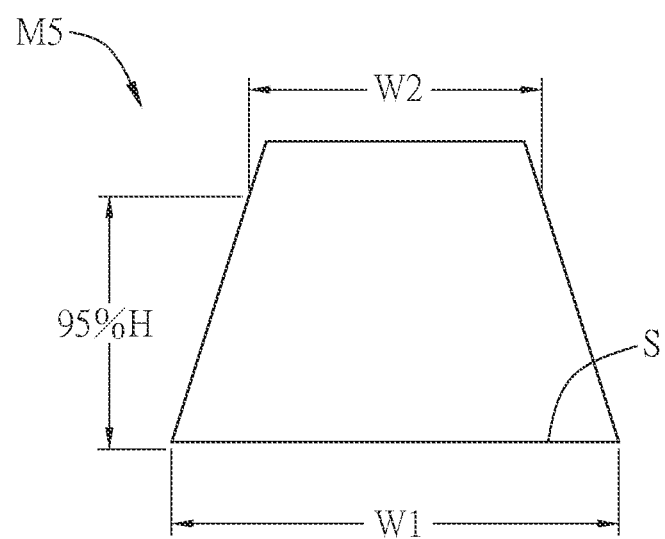
Figure 10C:
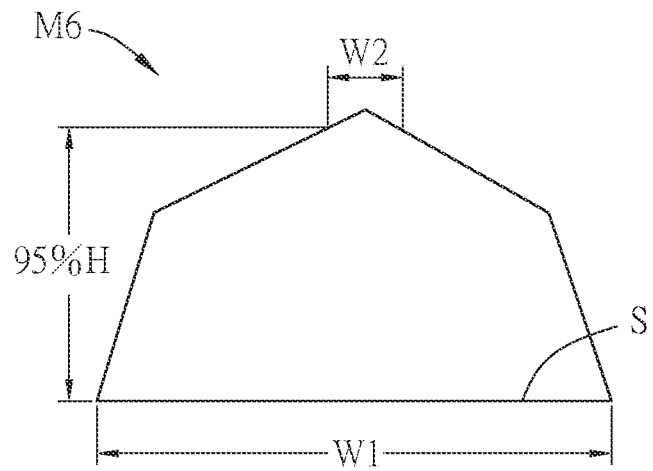

As shown in FIG. 10A, a microstructure M4 has a triangular form in cross-section. The microstructure M4 is connected to the light output side through a connection surface S. The connection surface S has a first width W1, the microstructure M4 has a second width W2 at the 95% of the height H, and the second width W2 is less than the first width W1. As shown in FIG. 10B, a microstructure M5 has a trapezoid form in cross-section. The microstructure M5 is connected to the light output side through a connection surface S. The connection surface S has a first width W1, the microstructure M4 has a second width W2 at the 95% of the height H, and the second width W2 is less than the first width W1. As shown in FIG. 10C, a microstructure M6 has a pentagonal sectional shape. The microstructure M6 is connected to the light output side through a connection surface S. The connection surface S has a first width W1, the microstructure M4 has a second width W2 at the 95% of the height H, and the second width W2 is less than the first width W1. In the event that the sectional shape of the microstructure is a polygon with n sides, the larger the value of n, the more similar the sectional shape of the microstructure to an arch.

Figure 11:
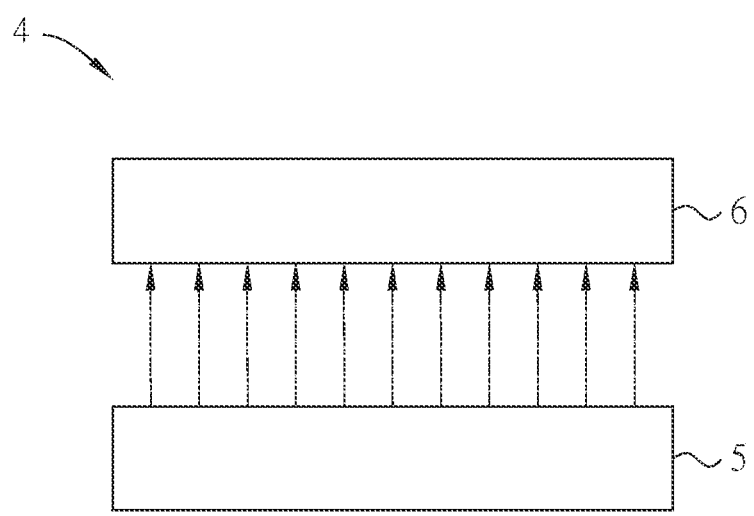
FIG. 11 is a schematic diagram of a display apparatus according to a preferred embodiment of the invention.

FIG. 11 is a schematic diagram of a display apparatus 4 according to a preferred embodiment of the invention. The display apparatus 4 includes a backlight module 5 and a display panel 6. The backlight module 5 can be anyone of the above backlight modules or have technical features of at least one of the above backlight modules. The display panel 6 is disposed adjacent to the backlight module 5, and the backlight module 5 provides the light to the display panel 6 for displaying images. In this invention, the display apparatus 4 is not limited in type, which can be an LCD apparatus for example.

Figure 12:
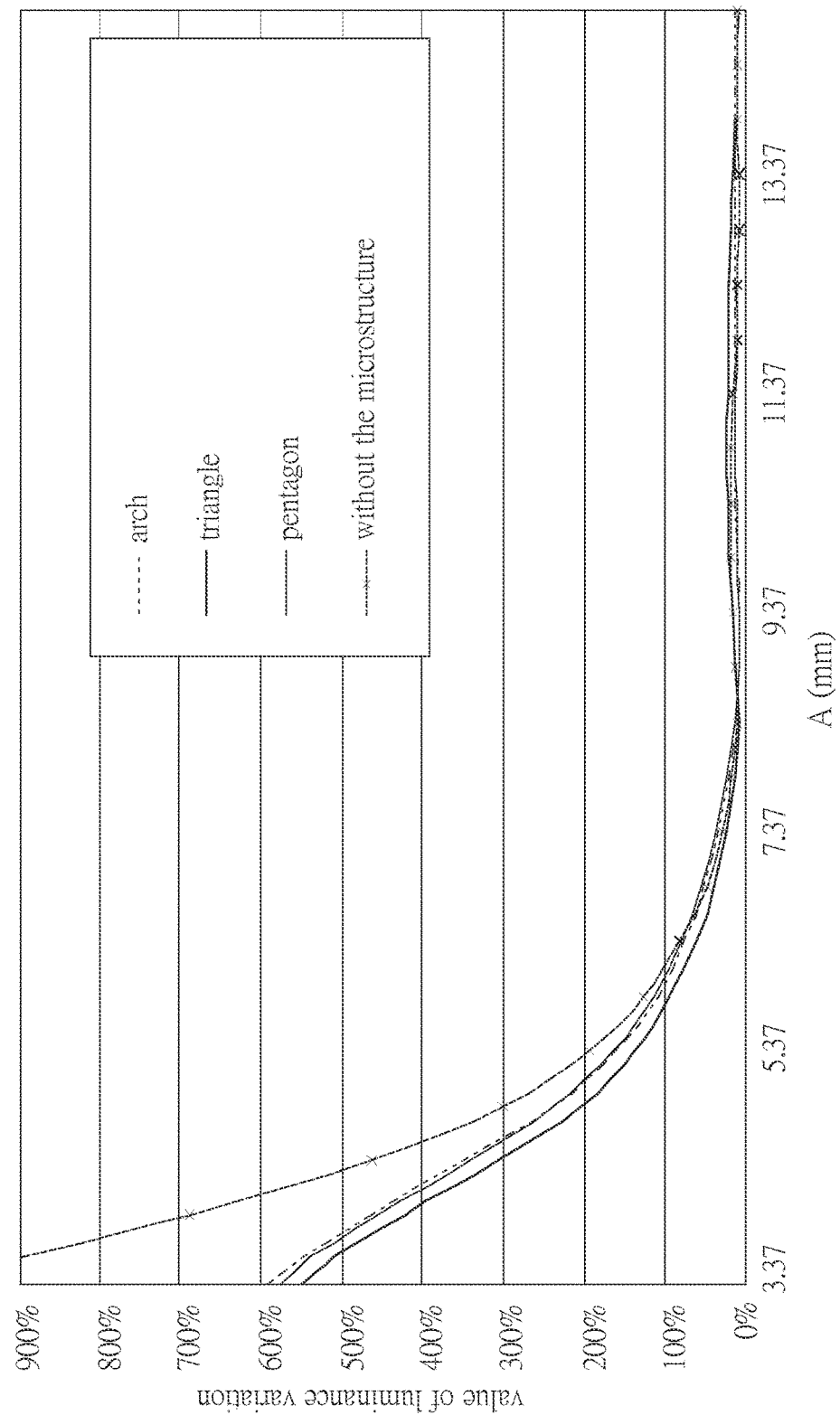
FIG. 12 is a schematic diagram representing different types of microstructures having different degrees of uniformity of luminance.

FIG. 12 is a diagram representing different types of microstructures having different degrees of uniformity of luminance. The x-axis of the diagram is the projection distance A from a luminance measuring line of the backlight module to the light emitting element, while the y-axis is the value of luminance variation. As shown in FIG. 12, the light guide plate with the microstructure having a sectional shape of triangle or pentagon has higher degree of uniformity of luminance with respect to the light guide plate without the microstructure.

In summary, in the display apparatus and backlight module according to the invention, the light output side of the light guiding plate includes a plurality of microstructures, and the structure characteristic of the backlight module is related to the width and height of the microstructure, the thickness of the light guiding plate, the pitch of the light emitting elements, and the projection distance from a luminance measuring line of the backlight module to the light emitting element. Therefore, by designing the structure characteristic of the backlight module as bounded by the first equation: $A=0.2\{[(H/P)/T]*P_{LED}\}^2-2\{[(H/P)/T]*P_{LED}\}+105$ mm and the second equation: $A=0.2\{[(H/P)/T]*P_{LED}\}^2-2\{[(H/P)/T]*P_{LED}\}+0.1$ mm, the display apparatus and backlight module can obtain the light output effect with a higher luminance uniformity and the hot spot problem can be effectively reduced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A backlight module, comprising:
   a light guiding plate including a first side and a second side opposite to the first side and a light output side connecting the first and second sides;
   a plurality of microstructures disposed on the light output side; and
   a plurality of first light-emitting elements disposed apart from each other and corresponding to the first side,
   wherein a width and height of one of the microstructures are respectively defined as P (μm) and H (μm), a thickness of the light-guiding plate is defined as T (mm), a pitch between the adjacent first light-emitting elements is defined as $P_{LED}$ (mm), a distance between a projection of a luminance measuring line on the light output side and the first light-emitting elements is defined as A (mm),
   wherein $0<[(H/P)/T]*P_{LED} \leq 15$, $0<A \leq 120$ mm, and $0.2\{[(H/P)/T]*P_{LED}\}^2-2\{[(H/P)/T]*P_{LED}\}+0.1$ mm$<A<0.2\{[(H/P)/T]*P_{LED}\}^2-2\{[(H/P)/T]*P_{LED}\}+105$ mm, and
   a maximum luminance value $L_{MAX}$ and a minimum luminance value $L_{MIN}$ measured along the luminance measuring line satisfies the following equation:

$$0<(L_{MAX}-L_{MIN})/L_{MIN} \leq 100\%.$$

2. The backlight module as recited in claim 1, wherein the microstructure has a sectional shape selected from the group consisting of triangle, trapezoid, pentagon, heptagon, and polygon.

3. The backlight module as recited in claim 1, wherein the microstructure has a sectional shape having the form of an arch.

4. The backlight module as recited in claim 1, wherein the microstructure is connected to the light output side through a connection surface, the connection surface has a first width, the microstructure has a second width at the 95% of the height, and the second width is less than the first width.

5. The backlight module as recited in claim 1, wherein microstructures are disposed in a region of the light output side, and at least two of the microstructures have different heights.

6. The backlight module as recited in claim 5, wherein the height of the microstructure in a near-light region is larger than that of the microstructure in a region other than the near-light region.

7. The backlight module as recited in claim 5, wherein the height of the microstructure in a near-light region is less than that of the microstructure in a region other than the near-light region.

8. The backlight module as recited in claim 1, wherein the maximum luminance value $L_{MAX}$ and the minimum luminance value $L_{MIN}$ are measured, and $0.2\{[(H/P)/T]*P_{LED}\}^2-2\{[(H/P)/T]*P_{LED}\}+1.8$ mm$<A<0.2\{[(H/P)/T]*P_{LED}\}^2-2\{[(H/P)/T]*P_{LED}\}+105$ mm.

9. The backlight module as recited in claim 1, wherein the maximum luminance value $L_{MAX}$ and the minimum luminance value $L_{MIN}$ are measured, and $0.2\{[(H/P)/T]*P_{LED}\}^2-2\{[(H/P)/T]*P_{LED}\}+3$ mm$<A<0.2\{[(H/P)/T]*P_{LED}\}^2-2\{[(H/P)/T]*P_{LED}\}+105$ mm.

10. The backlight module as recited in claim 1, wherein the maximum luminance value $L_{MAX}$ and the minimum luminance value $L_{MIN}$ are measured, and $0.2\{[(H/P)/T]*P_{LED}\}^2-2\{[(H/P)/T]*P_{LED}\}+5$ mm$<A<0.2\{[(H/P)/T]*P_{LED}\}^2-2\{[(H/P)/T]*P_{LED}\}+105$ mm.

11. The backlight module as recited in claim 1, wherein the maximum luminance value $L_{MAX}$ and the minimum luminance value $L_{MIN}$ are measured, and $0.2\{[(H/P)/T]*P_{LED}\}^2-2\{[(H/P)/T]*P_{LED}\}+45$ mm$<A<0.2\{[(H/P)/T]*P_{LED}\}^2-2\{[(H/P)/T]*P_{LED}\}+105$ mm.

12. The backlight module as recited in claim 1, wherein the maximum luminance value $L_{MAX}$ and the minimum luminance value $L_{MIN}$ are measured, and $0.2\{[(H/P)/T]*P_{LED}\}^2-2\{[(H/P)/T]*P_{LED}\}+49$ mm$<A<0.2\{[(H/P)/T]*P_{LED}\}^2-2\{[(H/P)/T]*P_{LED}\}+105$ mm.

13. The backlight module as recited in claim 1, wherein the maximum luminance value $L_{MAX}$ and the minimum luminance value $L_{MIN}$ are measured, and $0.2\{[(H/P)/T]*P_{LED}\}^2-2\{[(H/P)/T]*P_{LED}\}+52$ mm$<A<0.2\{[(H/P)/T]*P_{LED}\}^2-2\{[(H/P)/T]*P_{LED}\}+105$ mm.

14. The backlight module as recited in claim 1, wherein the height H is less than or equal to 500 μm and greater than zero.

15. The backlight module as recited in claim 1, wherein the width P is less than or equal to 3000 μm and greater than zero.

16. The backlight module as recited in claim 1, wherein the thickness T is less than 3 mm and greater than zero.

17. The backlight module as recited in claim 1, wherein the pitch PLED is less than 20 mm and greater than zero.

18. The backlight module as recited in claim 1, further comprising:
a plurality of second light-emitting elements disposed apart from each other and corresponding to the second side.

19. A display apparatus, comprising:
a display panel; and
a backlight module disposed adjacent to the display panel and providing light to the display panel, the backlight module comprising:
a light guiding plate including a first side and a second side opposite to the first side and a light output side connecting the first and second sides;
a plurality of microstructures disposed on the light output side; and
a plurality of first light-emitting elements disposed apart from each other and corresponding to the first side,
wherein a width and height of one of the microstructures are respectively defined as P (μm) and H (μm), a thickness of the light-guiding plate is defined as T (mm), a pitch between the adjacent first light-emitting elements is defined as $P_{LED}$ (mm), a distance between a projection of a luminance measuring line on the light output side and the first light-emitting elements is defined as A (mm),
wherein $0<[(H/P)/T]*P_{LED} \leq 15$, $0<A \leq 120$ mm, and
$0.2\{[(H/P)/T]*P_{LED}\}^2 - 2\{[(H/P)/T]*P_{LED}\} + 0.1$ mm $< A < 0.2\{[(H/P)/T]*P_{LED}\}^2 - 2\{[(H/P)/T]*P_{LED}\} + 105$ mm, and
a maximum luminance value $L_{MAX}$ and a minimum luminance value $L_{MIN}$ measured along the luminance measuring line satisfies the following equation:

$$0<(L_{MAX}-L_{MIN})/L_{MIN} \leq 100\%.$$

* * * * *